United States Patent [19]
Pan et al.

[11] Patent Number: 5,950,170
[45] Date of Patent: Sep. 7, 1999

[54] METHOD TO MAXIMIZE CAPACITY IN IC FABRICATION

[75] Inventors: Yirn-Sheng Pan; Horng-Huei Tseng, both of Hsinchu, Taiwan

[73] Assignee: Vanguard International Semiconductor Corporation, Hsinchu, Taiwan

[21] Appl. No.: 08/840,193

[22] Filed: Apr. 11, 1997

[51] Int. Cl.[6] .................................................. G06F 17/60
[52] U.S. Cl. .................................. 705/7; 705/8; 706/19; 364/468.01; 364/468.28
[58] Field of Search .................... 705/7, 8; 371/21.1; 395/200.46, 800.11, 800.14; 706/19; 364/468.01, 468.28

[56] References Cited

U.S. PATENT DOCUMENTS

| | | | |
|---|---|---|---|
| 3,970,993 | 7/1976 | Finnila | 395/800.14 |
| 5,319,737 | 6/1994 | Reibling et al. | 706/19 |
| 5,357,612 | 10/1994 | Alaiwan | 395/200.46 |
| 5,555,249 | 9/1996 | Hilley et al. | 371/21.1 |
| 5,586,021 | 12/1996 | Fargher et al. | 364/468.06 |
| 5,615,109 | 3/1997 | Eder | 705/8 |
| 5,630,070 | 5/1997 | Dietrich et al. | 705/8 |
| 5,671,284 | 9/1997 | Buer | 380/29 |
| 5,740,463 | 4/1998 | Oshima et al. | 395/800.11 |
| 5,818,716 | 10/1998 | Chin et al. | 364/468.06 |
| 5,825,650 | 10/1998 | Wang | 364/468.06 |
| 5,844,803 | 12/1998 | Beffa | 364/468.28 |
| 5,889,673 | 3/1999 | Pan et al. | 364/468.03 |

OTHER PUBLICATIONS

Optimisation of empirical model for IC fabrication process using linear programming. By Spervak D.; Ferguson, R.S.; Walton, A.J.; Newsam, M.I., IEE Electronic Library. Science, Measurement and Technology, IEE Proceedings—pp. 58–60, Mar. 1998.

*Primary Examiner*—Allen R. MacDonald
*Assistant Examiner*—M. Irshadullanh
*Attorney, Agent, or Firm*—Christensen O'Connor; Johnson & Kindness PLLC

[57] ABSTRACT

A method to maximize throughput of a group of multi-process machines whereby the number of each kind machine is determined. Then, the machine assignment of each machine is assigned a variable. Next, the throughput definition for each machine is calculated from a database of past production runs. Next, the capacity of each process is calculated. Then, the constraints of the machine assignment variables are determined. A linear programming model is then derived for the system. The linear programming model is then executed under the constraints to determine optimal machine assignments to maximize the capacity of the minimum capacity process.

10 Claims, 2 Drawing Sheets

METHOD TO MAXIMIZE CAPACITY IN IC FABRICATION

FIELD OF THE INVENTION

The present invention relates to resource allocation in fabrication processes and, more particularly, to machine assignment in semiconductor integrated circuit (IC) fabrication processes. Still more particularly, the present invention relates to methods of modeling the throughput of a group of machines whereby the machine assignment can be optimized for maximum throughput.

BACKGROUND OF THE INVENTION

In a production environment, bottlenecks typically occur from time to time at various steps during the production or fabrication process, influencing the throughput of the process. Similarly, in an integrated circuit manufacturing plant, the throughput of a foundry is generally influenced by various many factors and steps during the fabricating process, which may create bottlenecks. For example, the processing rate, the utilization and the loading density of the equipment are all the factors that will influence the throughput of the foundry.

Typically, the process of manufacturing the ICs includes over three hundred steps, which not only makes the manufacturing process complex in itself, but also makes complex the allocation of resources to perform the processes in an efficient manner. Further complicating the allocation of resources is the use of machines capable of performing multiple processes. For example, a foundry may have m types of machines allocated to perform p different processes. Further, each machine may perform processes at different rates and may not be capable of performing all p processes. In order for foundry supervisors to efficiently utilize the resources of the foundry, it is important to determine a model for the throughput of the resources in which the allocation of the resources maximizes the throughput or capacity of the foundry.

SUMMARY OF THE INVENTION

In accordance with the present invention, a method is provided to determine an optimal allocation of resources in a foundry. In one embodiment, the throughput of a group of multi-process machines are modeled using multi-constraint linear programming techniques. These machines are used to perform p processes, where p is an integer greater than zero.

First, the number m of each kind of machine in the foundry is determined, where m is an integer greater than zero. The number of each machine type is denoted Ni, where Ni is a positive integer and i ranges from one to m. Next, a variable Mij is assigned to each machine type, with i indicating the machine type and j indicating the process, where j is a positive integer ranging from one to p. The variable Mij represents the throughput percentage that machines of the ith machine type are allocated to performing the jth process.

The next step of the method is to generate the throughput definition for each type of machine for each process. The throughput of each machine for each process is derived for each machine from historical data of past production runs. The throughput of an ith machine type for a jth process is represented by Tij, where i indicates the machine type and j indicates the process.

Next, the capacity of each process is calculated by using $M_{ij}*T_{ij}$ for each value of i from one to m. That is, the capacity of jth process is represented by the equation:

$$E_j = \sum_{i=1}^{m} M_{ij} * T_{ij}$$

The minimum or smallest value of Ej value represents a "bottleneck", which limits the throughput of the group of machines as a whole.

Next, the constraints of the modeling method are determined. In this embodiment, there are two constraints: (i) the sum of the throughput percentages each ith machine type for all j processes is equal to the number of machines in the ith machine type; and (ii) the throughput percentage of each ith machine type for each jth process is not negative. These constraints are listed in mathematical form below.

$$\sum_{j=1}^{p} M_{ij} = N_i$$

$$M_{ij} >= 0$$

Next, a linear programming model is built up using these constraints. The objective of the linear programming model is to maximize the smallest value of Ej. The final step of this embodiment of the method is to find an optimal machine assignment using the linear programming model to maximize the throughput of the bottleneck process, which maximizes the throughput of the group of machines.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Figure 1:
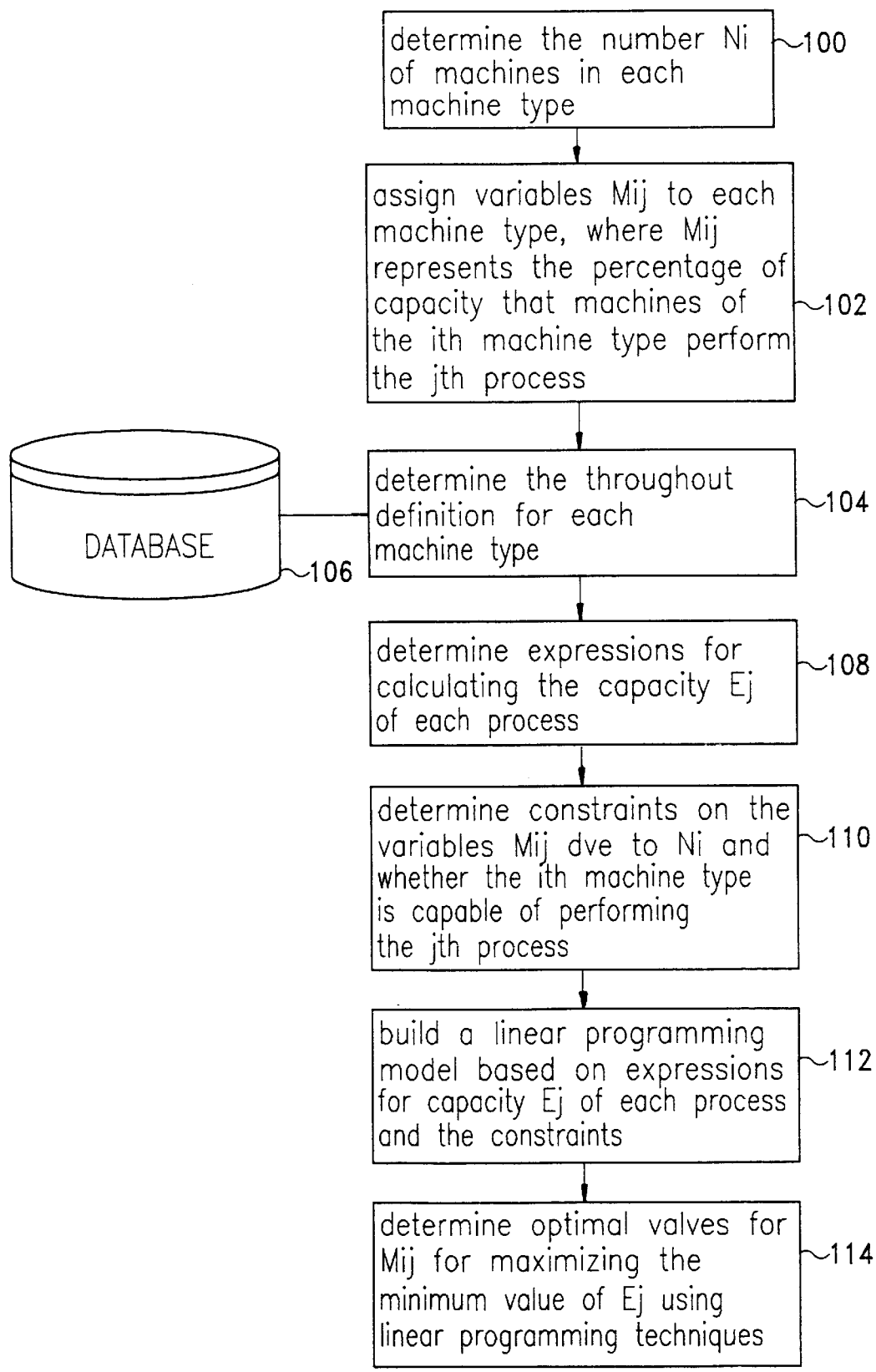
FIG. 1 is a flow chart illustrating a modeling method according to one embodiment of the present invention.

FIG. 1 is a flow chart of a method to model the processing capacity of a group of machines capable of varying machine and process allocation to determine the maximized capacity in an integrated circuit (IC) fabrication process, according to one embodiment of the present invention. This embodiment is adapted for use with IC fabrication machines, and is advantageously used for a single grouped process with multiple constraints.

First, the number m of each type or kind of machine in the foundry is determined in a step 100. Of course, m will be an integer greater than zero. The number of each type of machine is then determined. The number of machines of the ith machine type is denoted by $N_i\{i=1, 2, \ldots, m, m$ is positive integer number$\}$.

Next, in a step 102 a variable Mij is assigned to each machine type, with i indicating the machine type and j indicating the process, where j is a positive integer ranging from one to p. The variable Mij represents the percentage that machines of the ith machine type are allocated to performing the jth process. In the other words, the throughput percentage that the machines of the ith type are assigned to perform the jth process Mij percent {i=1, 2, ... m, j=1, 2, ... p}. For example, the throughput percentage that machine(s) of type "2" are used to perform the process "3" is denoted by $M_{23}$. TABLE 1 lists the allocation for the m machine types and the p processes.

TABLE 1

|  | machine type 1 | machine type 2 | machine type 3 | ... | machine type m |
|---|---|---|---|---|---|
| process 1 | $M_{11}$ | $M_{21}$ | $M_{31}$ | ... | $M_{m1}$ |
| process 2 | $M_{12}$ | $M_{22}$ | $M_{32}$ | ... | $M_{m2}$ |
| ... | ... | ... | ... | ... | ... |
| process p | $M_{1p}$ | $M_{2p}$ | $M_{3p}$ | ... | $M_{mp}$ |

Those skilled in the art will appreciate that the variable Mij is constrained to be greater than or equal to zero.

In a next step 104, the throughput definition Tij of each machine type for each process is determined, where Tij represents the throughput of the ith machine type performing the jth process. The throughput definition Tij is determined from the past throughput performance of each machine type for each process. In this embodiment, a database 106 that stores the throughput of past production runs of each machine for each process is accessed during the step 104 to determine the throughput definition of each machine type for each process. Of course, if the ith machine type is not capable of performing the jth process, the throughput definition Tij is equal to zero. The throughput definition of the m machine types and p processes is listed in TABLE 2.

TABLE 2

|  | machine type 1 | machine type 2 | machine type 3 | ... | machine type m |
|---|---|---|---|---|---|
| process 1 | $T_{11}$ | $T_{21}$ | $T_{31}$ | ... | $T_{m1}$ |
| process 2 | $T_{12}$ | $T_{22}$ | $T_{32}$ | ... | $T_{m2}$ |
| ... | ... | ... | ... | ... | ... |
| process p | $T_{1p}$ | $T_{2p}$ | $T_{3p}$ | ... | $T_{mp}$ |

Next, in step 108, the capacity of each machine type performing each process is calculated by using Mij*Tij. Thus, the capacity Ej of jth process is calculated by equation 1 below.

$$E_j = \sum_{i=1}^{m} M_{ij} * T_{ij} \{i = 1, 2, ..., m, j = 1, 2 ..., p\} \quad (1)$$

The smallest or minimum value of Ej represents the "bottleneck" that limits the capacity or throughput of the group of machines.

Next, the constraints of the modeling method are determined in a step 110. Because a single machine has a total throughput percentage of 100% or 1, the sum of the throughput percentages of the ith machine type for all j processes must be equal to the number of machines of the ith machine type. This constraint is listed below in mathematical form as equation 2.

$$\sum_{j=1}^{p} M_{ij} = N_i \quad (2)$$

In addition, the throughput percentage of the ith machine type performing the jth process must be non-negative. That is, the machine(s) of the ith machine type either perform the process (so the throughput percentage will be a positive value) or does not perform the process (so the throughput percentage is zero). This constraint is listed below in mathematical form as equation 3.

$$M_{ij} \geq 0 \quad (3)$$

Once the constraints are determined, standard linear programming techniques are used in a step 112 to build a linear programming model for the throughput of the group of machines. For example, the linear programming technique disclosed in "Linear programming in single and multiple-objective system", Prentice Hall press, 1982, is used in this embodiment, although any suitable linear programming technique can be used in other embodiments. The objective of the linear programming model is to maximize the smallest or minimum value of Ej (see equation 1) of the j processes under the constraints of equations 2 and 3. In light of this disclosure, those skilled in the art can program a workstation or standard personal computer to perform the linear programming technique without undue experimentation. In this embodiment, a 486-66 based computer is used to perform the linear programming technique.

Then in a step 114, the linear programming technique is executed to find an optimal machine assignment for maximizing the throughput or capacity of the group of machines.

Figure 2:
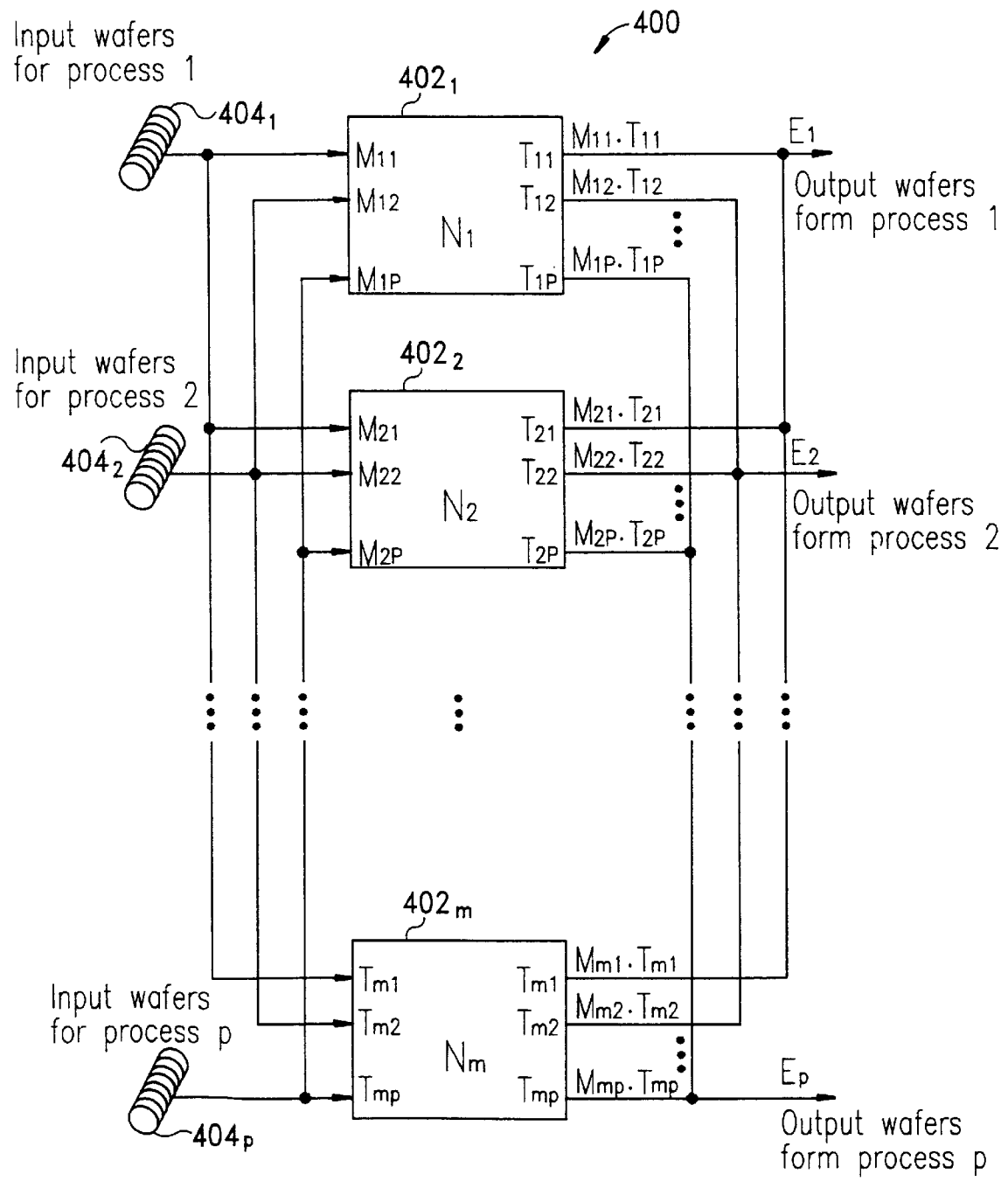
FIG. 2 is a block diagram illustrating allocation of resources according to the method illustrated in FIG. 1.

FIG. 2 is a block diagram of the group of machines 400 illustrating the application of the modeling and assignment method described above in conjunction with FIG. 1. Machine(s) 402$_1$ are a group of one or more machines (i.e., $N_1$) of a first type. For example, the first type of machine may be model Etcher machines available from etching process. Similarly, machines 402$_2$–402$_m$ are groups of one or more machines of the second through mth machine types, respectively. In this example, wafers are provided to the group of machines 400 for undergoing processes one through p. Wafers 404$_1$ are wafers to undergo the first process. Similarly, wafers 404$_2$ through 402$_p$ are to undergo the second through pth process. As shown in FIG. 2, the wafers 404$_2$–404$_p$, in general, are distributed to the machines 402$_1$–402$_m$, in which the wafers undergo the desired processes.

Each machine of the ith machine type then performs the jth process on the appropriately received wafers according to the throughput percentage Mij as determined in accordance with this embodiment of the present invention. For example, the machines 402$_1$ perform those of the first through pth processes according to the capacity percentage $M_{11}$–$M_{1p}$. Of course, those of the p processes that the machines 402$_1$ cannot perform will have an assignment of zero.

The throughput of the ith machine type for the jth is then Mij*Tij. Accordingly, the jth process has a total throughput Ej from the group of machines 400 equal to the sum of the throughputs of the machines 402$_1$–402$_m$ for the jth process. The value of Ej is calculated using equation 1. As described above in conjunction with FIG. 1, this embodiment of the present invention determines optimal values of the assignments $M_{11}$–$M_{1p}$ to maximize the minimum value of Ej (i.e., the "bottleneck" process). Of course, maximizing the bottleneck process tends to maximize the throughput of the group of machines 400.

An example of this embodiment of the present invention is described below in conjunction with FIG. 1. In this example, there are three etching to be performed by a group of four machines of different types. Thus, in the step 101, the number Ni of each type of machine is equal to one (i.e., $N_1=N_2=N_3=N_4=1$).

Next, the step 102 is performed to assign variables Mij for the throughput percentage for each machine. In this example, the first process is for SiN etching. The second process is for tetraethylorthosilicate (TEOS) etching. The third process is for spacer etching. Further, in this example, the first machine (i.e., etcher A) can perform the SiN and spacer etching processes but not the TEOS etching process. The second machine (i.e., etcher B) can perform the SiN and TEOS etching processes but not the spacer etching process. The third and fourth machines (i.e., etchers C and D) can perform the TEOS and spacer etching processes but not the SiN process. The assignment is listed below in TABLE 3.

TABLE 3

|  | etcher A | etcher B | etcher C | etcher D |
|---|---|---|---|---|
| SiN etching | $M_{11}$ | $M_{21}$ | $M_{31}$ | $M_{41}$ |
| TEOS etching | $M_{12}$ | $M_{22}$ | $M_{32}$ | $M_{42}$ |
| spacer etching | $M_{13}$ | $M_{23}$ | $M_{33}$ | $M_{43}$ |

However, due to the limitations of the various machines, the values of some of $M_{12}$, $M_{23}$, $M_{31}$ and $M_{41}$ are set to zero (i.e., $M_{12}=M_{23}=M_{31}=M_{41}=0$).

Then, in the step 104, the throughput definition Tij of each etcher for these etching processes are determined using the information provided by the database 106. In this example, the Tij for each process and machine is listed in TABLE 4. The values shown in the TABLE 4 are wafers/hour.

TABLE 4

|  | etcher A | etcher B | etcher C | etcher D |
|---|---|---|---|---|
| SiN etching | 100 | 100 | 0 | 0 |
| TEOS etching | 0 | 150 | 150 | 150 |
| spacer etching | 200 | 0 | 200 | 200 |

Next, in the step 108, the capacity of each etching process is calculated by using equation 1. The capacity of each etching process is listed below in TABLE 5.

TABLE 5

| Process | Capacity or throughput |
|---|---|
| SiN etching | $E_1 = M_{11}*100 + M_{21}*100$ |
| TEOS etching | $E_2 = M_{22}*150 + M_{32}*150 + M_{42}*200$ |
| Spacer etching | $E_3 = M_{13}*200 + M_{33}*200 + M_{43}*200$ |

Next, the step 110 is performed to determine the constraints on the model. Using equation 2, one set of constraints is listed in TABLE 6.

TABLE 6

| Machine Type | Equation 2 Constraints |
|---|---|
| Etcher A | $M_{11} + M_{12} + M_{13} = 1$ |
| Etcher B | $M_{21} + M_{22} + M_{23} = 1$ |
| Etcher C | $M_{31} + M_{32} + M_{33} = 1$ |
| Etcher D | $M_{41} + M_{42} + M_{43} = 1$ |

Using equation 3, the constraints are $M_{12}=M_{23}=M_{31}=M_{41}=0$, with the remaining percentage throughput variables being greater than or equal to zero.

In the step 112, the linear programming model is built up. The constraints, throughput definitions, and equations for Ej are programmed in to the aforementioned 486–66 computer, along with the linear programming technique.

Then in the step 114, the linear programming technique is executed to determine optimal machine assignments to maximize the capacity of the machines. The calculated values of Mij are listed below in TABLE 7. Using this machine assignment, the total capacity of the machines could reach about 185 wafers.

TABLE 7

| $M_{11} = 0.938$ | $M_{21} = 0.908$ | $M_{31} = 0$ | $M_{41} = 0$ |
| $M_{12} = 0$ | $M_{22} = 0.092$ | $M_{32} = 0.569$ | $M_{42} = 0.569$ |
| $M_{13} = 0.062$ | $M_{23} = 0$ | $M_{33} = 0.431$ | $M_{43} = 0.431$ |

As is understood by a person skilled in the art, the foregoing described embodiments of the present invention are illustrative of the present invention rather than limiting. Instead, the present invention is intended to cover various modifications and similar arrangements. Accordingly, while the preferred embodiment of the invention has been illustrated and described, it will be appreciated that various changes can be made therein without departing from the spirit and scope of the present invention.

The embodiments of the invention in which an exclusive property or privilege is claimed are defined as follows:

1. A computer-implemented method for maximizing the capacity of a plurality of machines in a semiconductor foundry, the method comprising the steps of:

determining a number of each kind of machine in said foundry and a number of each machine type in said foundry, forming a machine assignment array having a percentage of capacity of an $i^{th}$ machine type assigned to perform a $j^{th}$ process, and wherein i is an integer that ranges from 1 to m, and j is an integer that ranges from 1 to p;

forming a throughput array for each said percentage of capacity from historical data of past production runs of said plurality of machines;

calculating a capacity of each said process by summing products of said throughput percentage and a throughput of said $i^{th}$ machine type for said $j^{th}$ process; determining one or more constraints on values of said throughput percentage; generating a linear program model to maximize a smallest value of capacity within said constraints, for each value of i and j; and assigning a machine using said linear programming model to maximize throughput of a bottleneck process, thereby maximizing said capacity of said plurality of machines.

2. The method of claim 1, further comprising determining a number of machines of each $j^{th}$ machine type, for each value of i.

3. The method of claim 2, wherein said constraints include a constraint that for an $i^{th}$ machine type, a sum of each said throughput percentage for every value of j is equal to said number of machines of each $i^{th}$ machine type.

4. The method of claim 1, wherein said constraints include a constraint that for an $i^{th}$ machine type and a $j^{th}$ process, said throughput percentage must be equal to zero if the $i^{th}$ machine type cannot be configured to perform the $j^{th}$ process.

5. The method of claim 1, wherein said constraints include a constraint that for an $i^{th}$ machine type and a $j^{th}$ process, said throughput percentage must be greater than or equal to zero if the $i^{th}$ machine can be configured to perform the $j^{th}$ process.

6. A computer readable storage disk, said disk storing a computer program that performs steps for maximizing the capacity of a plurality of machines in a semiconductor foundry, the steps comprising:

determining a number of each kind of machine in said foundry and a number of each machine type in said foundry;

forming a machine assignment array having a percentage of capacity of an $i^{th}$ machine type assigned to perform a $j^{th}$ process, and wherein i is an integer that ranges from 1 to m, and j is an integer that ranges from 1 to p;

forming a throughput array for each said percentage of capacity from historical data of past production runs of said plurality of machines;

calculating a capacity of each said process by summing products of said throughput percentage and a throughput of said $i^{th}$ machine type for said $j^{th}$ process;

determining one or more constraints on values of said throughput percentage;

generating a linear programing model to maximize a smallest value of capacity within said constrains, for each value of i and j; and assigning a machine using said linear programming model to maximize said throughput of a bottleneck process, thereby maximizing said capacity of said plurality of machines.

7. The disk of claim 6, further including the step of determining a number of machines of each $i^{th}$ machine type, for each value of i.

8. The disk of claim 7, wherein said constraints include a constraint that for an $i^{th}$ machine type, a sum of each said throughput percentage for every value of j is equal to said number of machines of each $i^{th}$ machine type.

9. The disk of claim 6, wherein said constraints include a constraint that for an $i^{th}$ machine type and a $j^{th}$ process, said throughput percentage must be equal to zero if the $i^{th}$ machine type cannot be configured to perform the $j^{th}$ process.

10. The disk of claim 6, wherein said constraints include a constraint that for an $i^{th}$ machine type and a $j^{th}$ process, said throughput percentage must be greater than or equal to zero if the $i^{th}$ machine can be configured to perform the $j^{th}$ process.

* * * * *

UNITED STATES PATENT AND TRADEMARK OFFICE
CERTIFICATE OF CORRECTION

PATENT NO. : 5,950,170
DATED : September 7, 1999
INVENTOR(S) : Y.-S. Pan et al.

Page 1 of 2

It is certified that error appears in the above-identified patent and that said Letters Patent is hereby corrected as shown below:

| COLUMN | LINE | |
|---|---|---|
| Title Page col. 2 | Assistant Examiner | "Irshadullanh" should read --Irshadullah-- |
| 2 | Attorney, Agent, or Firm | after "O'Connor" delete ";" |
| 6 (Claim 1, | 41 line 18) | begin new subparagraph with "determining one or more..." |
| 6 (Claim 1, | 42 line 19) | begin new subparagraph with "generating a linear..." |
| 6 (Claim 1, | 46 line 23) | after "maximize" insert --said-- |
| 6 (Claim 2, | 50 line 2) | "$j^{th}$" should read --$i^{th}$-- |
| 7 (Claim 6, | 20 line 22) | "programing" should read --programming-- |

UNITED STATES PATENT AND TRADEMARK OFFICE
CERTIFICATE OF CORRECTION

PATENT NO. : 5,950,170
DATED : September 7, 1999
INVENTOR(S) : Y.-S. Pan et al.

It is certified that error appears in the above-identified patent and that said Letters Patent is hereby corrected as shown below:

COLUMN      LINE

7            21            "constrains" should read --constraints--
(Claim 6,    line 23)

Signed and Sealed this

First Day of August, 2000

Attest:

Q. TODD DICKINSON

Attesting Officer    Director of Patents and Trademarks